United States Patent [19]
Miller

[11] Patent Number: 5,472,750
[45] Date of Patent: * Dec. 5, 1995

[54] CONSTRUCTION ELEMENTS MADE FROM TIRE CARCASSES

[76] Inventor: Edward L. Miller, 3501 Woolman Dr., Haymarket, Va. 22069

[*] Notice: The portion of the term of this patent subsequent to Jul. 12, 2008, has been disclaimed.

[21] Appl. No.: 198,571

[22] Filed: Feb. 18, 1994

[51] Int. Cl.⁶ .................................................. B29C 53/00
[52] U.S. Cl. ........................... 428/2; 52/DIG. 9; 156/95; 428/64.1; 428/903.3
[58] Field of Search ............... 428/903.3, 2, 65, 428/36.91, 903.3; 52/DIG. 9; 156/95

[56] References Cited

U.S. PATENT DOCUMENTS

| | | | |
|---|---|---|---|
| 4,022,434 | 5/1977 | Moore | 52/DIG. 9 |
| 4,030,706 | 6/1977 | Ward | 52/DIG. 9 |
| 4,057,141 | 11/1977 | Laurie et al. | 428/903.3 X |
| 4,066,244 | 1/1978 | Yoho | 52/DIG. 9 |
| 4,142,821 | 3/1979 | Doring | 52/DIG. 9 |
| 4,186,913 | 2/1980 | Bruner et al. | 52/DIG. 9 |
| 4,312,600 | 1/1982 | Schaaf et al. | 52/DIG. 9 |
| 5,086,552 | 2/1992 | Moore | 52/DIG. 9 |
| 5,236,756 | 8/1993 | Halliburton | 428/903.3 X |
| 5,246,754 | 9/1993 | Miller | 428/903.3 X |

Primary Examiner—Henry F. Epstein
Attorney, Agent, or Firm—Terrance L. Siemens

[57] ABSTRACT

A general purpose laminated construction block element is constructed from discarded rubber-like material such as tire casings or belt conveyor straps. Tire casings are first cut open and laid flat to form flattened mats. The mats are then stacked and secured into blocks suitable for transport and storage. The blocks may be later disassembled and the individual mats spirally wound to form cylindrical posts. Alternately, the blocks may be used as formed for general purpose construction blocks. The properties of the laminated block can be adjusted by adjusting the properties of an adhesive which is applied to one surface of the mat prior to stacking. The laminated rubber blocks may be formed to predetermined sizes by appropriately preconfiguring the mat by juxtaposing or superposing multiple single tire mats. The laminated rubber-like blocks have excellent strength, impact and vibration absorbtion, and machinability. The recycling of such non-degradable waste material, as well as the provision of a superior replacement for natural wood products, is a double edged boon to the ecology.

9 Claims, 2 Drawing Sheets

CONSTRUCTION ELEMENTS MADE FROM TIRE CARCASSES

CROSS REFERENCE TO RELATED DOCUMENT

This application is an improvement in and refinement to my U.S. Pat. No. 5,246,754, issued Sep. 21, 1993, the subject matter of which is hereby incorporated by reference.

BACKGROUND OF THE INVENTION

1. Field of the Invention

This invention relates broadly to the field of construction and more particularly to the provision of new general purpose construction elements made from discarded pneumatic tire material. The construction elements provided by my prior U.S. Pat. No. 5,246,754 were primarily cylindrical in shape as posts, poles, or beams. This invention, on the other hand, recognizes that intermediate, generally rectangular shaped mats may be formed as a step in the production of such posts. The mats can be cut at one location and rolled in another. The formation of bales of such cut and flattened mats is convenient for transporting them to a post rolling site. Details of the mat cutting and post rolling operations are given in my prior U.S. Pat. No. 5,246,754. In addition, the bales of mats formed in accordance with this invention are separately useful as construction elements in their own right.

The instant invention also relates to the fields of environmental preservation and waste disposal, more specifically to recycling persistent non-biodegradable materials. Significant contributions are made to both fields by providing a new, useful, and inexpensive construction material which is easily made directly from a previously nearly indestructible item of scrap material causing worldwide disposal problems. The primary benefits to the environmental preservation and waste disposal industry are: (1) that the recycled product is made from the whole discarded item thus not creating more waste; (2) that the transformation to a useful product is done with very little energy expenditure; (3) that the entire process is virtually pollution free; and (4) that precious and dwindling forest resources may be preserved in that the product is contemplated to adequately replace wood in many applications.

The very toughness that makes old tire carcasses a difficult disposal problem lends strength and durability to the unique posts, poles, beams, stakes, girders, trestles, and supports made in accordance with the principles of my prior invention. This invention serves both to improve the efficiency of the manufacturing process of the old invention and to create another unique intermediate product which is useful in its own right. The new construction element proposed by the instant invention consists of bales of cut and flattened tire carcasses. It will become immediately evident that the unique physical properties of the construction elements produced in the manner herein disclosed will provide important benefits in many areas of the construction field.

The finished article of manufacture may take many forms as will be seen in the remainder of this specification. As such it will be appreciated that the potential uses are myriad. A comprehensive listing of all the possible fields to which this invention may be applied is limited only by the imagination and is therefore not attempted here. Some of the more obvious applications are mentioned herein in the interest of providing a full and complete disclosure of the unique properties of this hitherto unknown general purpose article of manufacture. Construction, environmental preservation, and waste disposal are seen as the fields most likely to gain immediate and substantial benefit from this invention. It is to be understood from the outset that the scope of this invention is not limited to these fields or to the specific examples of potential uses presented hereinafter.

2. Description of the Prior Art

From the outset it should be noted that the term rubber as used herein refers to the flexible material from which modern tires are formed in accordance with common usage. As such, the rubber bears little resemblance to the natural rubber made from the sap of the rubber tree. The vulcanized rubber pneumatic tire has proved to be both a blessing and a curse to modern society. We can't live without tires and we are just beginning to realize we can't live with millions of worn out tire carcasses clogging our landfills and littering our environment. Tires are particularly villainous at prematurely filling dump sites because their hollow toroidal shape is particularly volume consuming and they do not easily compress or nest within one another. About the only way anybody ever has gotten rid of a used tire has been to burn it. This solution has been so unsatisfactory that it is now illegal in most jurisdictions. Burning tires cause a horrible stench and pollute the air with toxic fumes and particles harmful to all life forms. Even expensive modern incineration devices, complete with scrubbers for the exhaust fumes, are inferior at destroying old tires. The steel belting materials clog the incinerator while the particulate carbon and sulfur compounds tend to foul the scrubbers. Additionally, many incineration devices consume electrical energy which serves primarily to transfer the pollution down the river to where the energy is being produced.

The difficulty in discarding worn out tires and the energy and raw materials required to manufacture them has inspired much effort to refurbish them for further use by retreading. However, there are several major problems with producing retread tires. The new tread which is to be bonded to the old tire must be produced somewhere. Extensive amounts of energy are used to produce the heat required to bond the new tread to the old tire and, even then, that crucial bonding is not always well accomplished. Both the bonding and the production of a new tread surface are, in many respects, just further examples of shipping the pollution down the river. All told, there is probably as much energy used and pollution produced in the manufacture of a retreaded tire as in the production of the original tire. Here, as in incineration, the steel belts and cords used in modern tires pose severe obstacles to the successful completion of the process. Not all tires can be effectively recycled by the retreading process. For example, if the sidewall or sealing bead is damaged there is no good means to reclaim that tire. The problem here is that a tire must not only have sufficient tread but must also meet stringent standards of flexibility, strength, air permeability, and appearance.

A second alternative of somehow reforming the old tire carcass into other useful articles has been pursued by others with generally limited success. It has been proposed that old tires could be shredded and used as a form of insulation material perhaps mixed with other insulation materials such as vermiculite. This proposal does indeed recognize the important property of extremely low thermal conductivity. The actual shredding process has proven extremely difficult, especially when steel belts are imbedded in the old tires. Even if the metal were successfully minced up with the rubber it would have to be separated later because it would seriously degrade the thermal insulation properties of the final product. Also, the actual volume of shredded material recovered in this manner would be relatively small with respect to the volume of the original tire carcasses. You would need a mountain of old tires to produce a truckload of shredded rubber insulation material, and that truckload might be enough to insulate one house. These relative quantities are, of course, not meant to be precise, but merely to point out the fact that there are problems of scale involved with shredding tire carcasses to produce a voluminous product such as household insulation.

Another use for shredded tire rubber has recently been proposed and given a certain amount of use with limited success. The shredded rubber is mixed with bituminous asphalt as a filler material in roadway construction. The long-term effectiveness of this use has yet to be determined. The above mentioned problems of scale are still present in forming the shredded rubber. Energy costs for the separation and shredding of the used tire rubber have, so far, proven to be economically prohibitive.

Following along with the idea of making some sort of useful product out of the old tire carcasses, there have been numerous proposals to create all kinds of decorative and ornamental articles from the tires. Examples of such uses are flower planters and landscape dividers. Two other applications of limited but useful merit will be familiar to all. Anyone from a farm or rural community will have seen a tire hung from a rope to form the familiar "tire swing". Anyone living on or near a body of water will have seen old tires attached to the sides of docks for cushioning the impacts of boats. This particular use highlights the important and useful impact absorption properties of the tire material.

Numerous examples of the prior art were considered in the examination of my prior patent. As will be seen, the simplicity and effectiveness of my invention is not rivaled in the prior art.

It has been recorded in the magazine "ABC-American Roofer and Building Improvement Contractor", February, 1978, that old truck tires have been flattened and used as a form of roofing. They are overlapped in an alternating tread-out tread-in pattern to form a watertight seal for this purpose. As best as can be determined, and in direct contrast with the instant invention, the sidewalls of the tire are removed and discarded prior to the flattening for use on a roof. By contrast, the instant invention proposes the forming of flattened mats from tire carcasses and the subsequent forming of bales of material by piling up and securing together the entire carcass mats, including the sidewalls.

Numerous United States Patents have been granted for various and sundry articles made from old tires. The largest group of these Patents are concerned with providing highway safety dividers or barriers thus effectively utilizing the inherent impact energy absorption characteristics of the rubber. Bruner et al, U.S. Pat. No. 4,186,913, shows an arrangement of side-by-side upright tire casings supported in a solid rubber block which is poured around the lower portions of the tires. Bruner also mentions the possible use of this arrangement as a breakwater. Ward, U.S. Pat. No. 4,030,706, shows a highway bumper guard made from two tire casings arranged concentrically within one another and with the inner casing being filled with particulate material such as sand. Ward recognizes that this arrangement will absorb impact energy by virtue of the friction between the concentric tires. As will be seen later, this type of internal friction can also be an important feature of my invention. Yoho, U.S. Pat. No. 4,066,244, shows an arrangement of upright tire casings connected together in transverse lines and rows for the purpose of absorbing impact energy. Schaaf et al, U.S. Pat. No. 4,312,600, discloses a traffic barricade, or marker, whose base is formed from a horizontal tire casing. Schaaf recognizes that the interior portion of the tire casing may be filled with a buoyant material thus forming a buoy marker. By contrast none of these inventions contemplates the cutting, flattening, stacking, and securing of tire carcasses so as to form the bales of the instant invention.

Other miscellaneous exploitations of used tire casings are shown by Doring, U.S. Pat. No. 4,142,821 and by Moore, U.S. Pat. No. 4,022,434. Doring shows ground stabilization devices for embankments, etc., made from variously interconnected loops of tire treads with the sidewalls removed. Moore shows a means of stacking and interconnecting upright tires to form a fence. The tire fence is supported by partially burying the lower course of tires. Moore recognizes yet another important property of the tire material, low electrical conductivity. Moore exploits this property by stringing electrified barbed wire directly from his fence without the need for expensive electrical insulator offset devices of any kind. As will be seen later, this is another property which enhances the overall desirability of my invention. By contrast, my invention proposes the cutting and flattening of entire tire carcasses followed by stacking them into bales or blocks.

The many and varied previous uses for old tire casings serve to illustrate and take advantage of the important property of chemical inertness. Tire casing material will not rot, decay, decompose, deteriorate, or easily disintegrate. Tire casings are impervious to attack from mold, fungus, or bacteria, or other micro-organisms. Insects, rodents, birds, bats, deer, barnacles, and other animals can not destroy tire casings. Corrosive agents, such as salt water and most acids, do not harm tire casings. Prolonged exposure to ultra-violet radiation does not degrade tire casing material. Tire material will withstand extreme climatic temperature ranges without substantial deterioration of its excellent strength and toughness characteristics.

In spite of the many and varied uses for old tire casings proposed by the prior art, it is well known that old tires are most often discarded in garbage dumps where they often collect stagnant water and serve as breeding grounds for mosquitoes and other pests.

My invention proposes a new product, made from those old tires, whose usefulness is so general and application so broad that old tires will no longer need to be discarded and, in fact, may become valuable commodities.

None of the above inventions and patents, taken either singly or in combination, is seen to anticipate or make obvious the instant invention as claimed.

SUMMARY OF THE INVENTION

Briefly, beginning with a tire casing in its conventional toroidal shell configuration, the entire carcass is first formed into a flattened sheet-like piece of rubber material. A process of forming such flattened mats by slitting and unrolling used tire carcasses is fully described in my prior U.S. Pat. No. 5,246,754. The flattened mats are then stacked and secured to one another so as to form a generally solid cube or bale shaped article. The flat mats are stacked tightly upon one another to form a nearly solid block of reinforced rubber material. The securement of the mats to one another may be temporary in nature so as to merely facilitate transportation and/or storage of the bales prior to separating for use in another process such as the rolling step in my prior U.S. Pat. No. 5,246,754. The securement may be durable so as to form a lasting bale which is independently useful as a general purpose construction block.

The mats formed from conventional sized tire carcasses are generally rectangular with a long axis and a short axis. The long and short axes can be oriented and overlapped in several ways to produce construction blocks of various dimensions. An idea of the scale involved can be gleaned from the fact that a standard truck tire flattened in this fashion will form a mat with a long axis of approximately 11 feet. By overlapping and/or interlocking several tire mats either end-to-end or side-by-side, block elements of virtually any length, width, and height can be produced. The original smooth inner surface of the tire may be stacked to the outside so as to form a smooth outer surface on the construction block. Also, burnishing or otherwise machining the outer surface is more fully discussed in the detailed description. Mechanized equipment can be used to quickly and tightly stack and secure the rubber mats, although only small forces are needed as shown by the fact that successful manual stacking and securing with simple hand tools has been accomplished.

Accordingly, it is a principal object of the invention to provide a new and improved construction element made from tire carcasses which overcomes the disadvantages of the prior art in a simple but effective manner.

A major goal of the instant invention is to provide a viable and practical means to dispose of used tire carcasses.

A major object of this invention is to provide new and heretofore unknown blocks of construction material having excellent strength-to-weight ratio, low electrical and thermal conductivity, superb toughness and durability, splendid vibration, sound and impact energy absorption properties, and attractive appearance.

A further object of this invention is to provide means for making these blocks or cubes inexpensively by using discarded tire carcasses as the primary raw material and by using a process that consumes very little energy.

Another object of the instant invention is to provide an improvement in the efficiency of the process disclosed in my previous invention for forming posts from used tire carcasses. This is done by providing easily transportable bales of material allowing for the cutting and rolling steps of my previous invention to be performed at widely separated sites.

A further object is to preserve the environment by eliminating the need to dispose of old tires, by not creating secondary air pollution in the recycling process, and saving the forests by providing a practical replacement for wood and lumber in many instances.

It is a major goal of the invention to provide improved elements and arrangements thereof in an apparatus for the purposes described which is inexpensive, dependable and fully effective in accomplishing its intended purposes.

It is submitted that the present invention meets or exceeds all the above objects and goals.

It will be understood that the finished stacked and secured bale product so far described is not necessarily "finished" in the sense that it is ready to be sold in commerce except perhaps as a raw material to be used in manufacturing other products. The finally stacked and secured blocks made from layered mats formed as above is in many ways similar to a block of wood and should be able to be machined and formed in much the same way. Special tooling may be developed for further machining these layered rubber blocks, but it is anticipated that conventional woodworking tools will be satisfactory in most instances.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
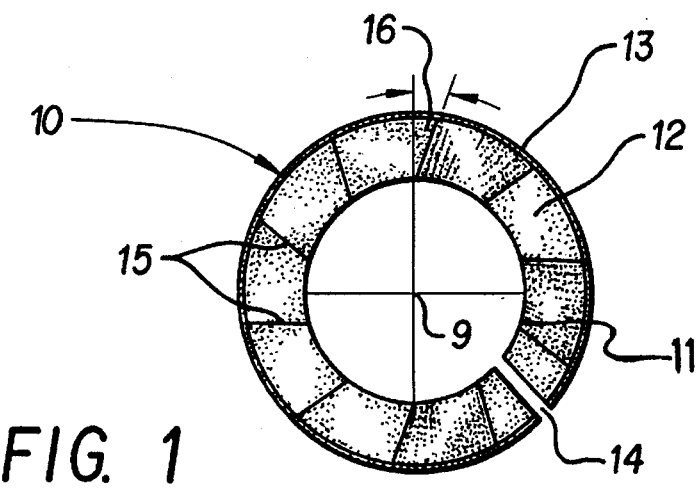
FIG. 1 is a side view of a conventional tire casing showing the position of the several cuts which are made to allow the tire to be unwrapped into a flat mat form.

In FIG. 1 a conventional tire carcass 10 is shown with markings where cuts or slits will be made prior to unrolling and flattening the carcass. The original carcass 10 is roughly in the form of a toroidal surface. A torus is formed by rotating a plane closed curve (in this case the generally circular cross-section of the tire sidewalls and tread) about an axis outside of, but in the plane of the closed curve (in this case the center line or axis of rotation of the tire). This axis is known as the toroidal axis 9. In more succinct layman terms the tire is shaped like a donut. The tire casing generally comprises two circular sealing beads 11, two sidewall portions 12, and outer circumferential tread surface 13. The inner portion of the toroid is missing as this portion is generally taken up by the wheel of the tired vehicle as is well known in conventional wheel tire geometry. The rear sealing bead and the rear sidewall portion are hidden from view in the side elevation of the tire shown. Major cut 14 is used to break the ring shape of the original tire to permit unwrapping into a flat mat-like shape. This cut can be made along a plane containing the toroidal axis previously described. In this case square ends are created when the tire carcass is unwrapped. Alternately, it is possible make cut 14 along a plane parallel to but not containing the toroidal axis of revolution 9. In this case the ends of the tread portion would still be square in the unwrapped shape but the ends of the sidewall portions would be angled somewhat in the flattened condition. Also, it is possible to make cut 14 along a plane intersecting the toroidal axis at an angle. In this case the unwrapped form would not have square ends but would rather be angled so as to roughly resemble a parallelogram. It is foreseen that cut 14 could also be made along a line which does not lie in a single plane (such as a zigzag or a spiral) for the special purpose of forming two separate mats that could be abutted, interlocked, or otherwise joined to form a single mat of greater area.

Figure 2:
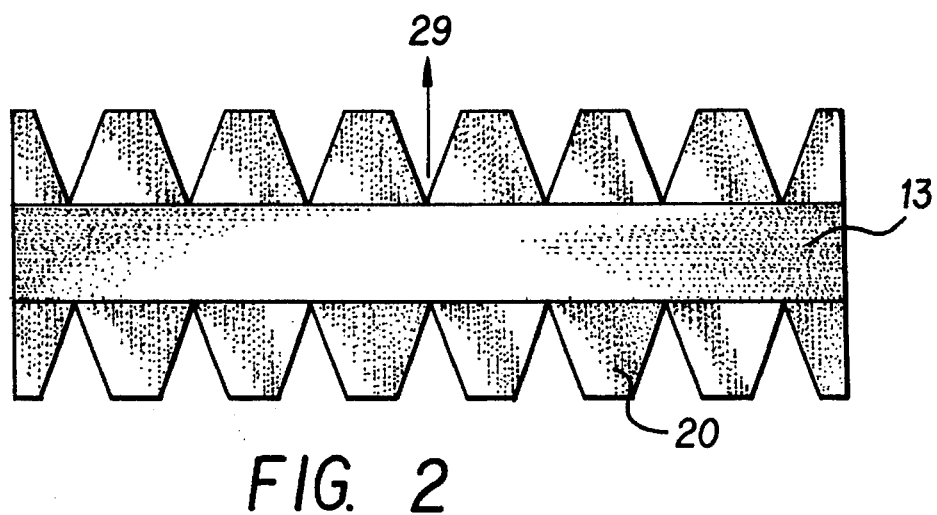
FIG. 2 is a top view of the inside surface of one embodiment of the tire mat after it has been cut and flattened.
Figure 3:
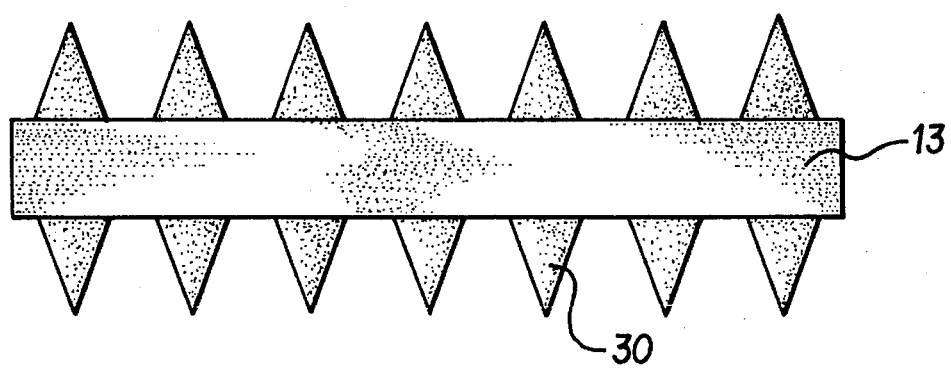
FIG. 3 is a top view of the inside surface of another embodiment of the tire mat after it has been cut and flattened.

One skilled in the art will recognize that cut 14 will not be sufficient alone to allow the tire casing to be flattened into a mat as desired. The sidewall portions 12 must also be slit with a series of approximately radial cuts 15 through the sealing bead 11 out as far as, but not through, the tread section 13. It is a matter of design choice as to the actual number of such cuts 15 needed. In general the cuts 15 should be close enough together to allow easy outward folding of the sidewall tab portions 20 (see FIG. 2) away from the tread portion 13. The cuts 15 may be angled slightly from the radial direction as shown by angle 16. The precise angle of these cuts determines the angulation of the trapezoidal sidewall tabs 20 in the flattened form of the tire casing shown in FIG. 2. As with the major cut 14, these sidewall cuts 15 might be varied at will to achieve desired shapes of the flattened mat surface. Also they may be more than simple slits and serve to actually remove portions of the side wall so as to form special shapes in the sidewall tabs 20. These tab shapes may be chosen to nest with one another to form a mat of the same length but double width. FIG. 3 shows a mat formed with such a special cut so as to produce triangular sidewall tabs 30 of just the right shape to fit in the triangular notches between trapezoidal tabs 20 in the mat of FIG. 2. It will be recognized that the possible variations of special cuts are endless and may be used to fit numerous flattened tire mats together, both in side-by-side and end-to-end relationships. It is contemplated, although not shown, that cuts could be made such that adjacent mats could actually be interlocked with one another in jigsaw puzzle fashion. It is also contemplated that numerous mats could be laid atop one another with the thicker tread portion of one mat being placed above the thinner sidewall portion of the next to form an overall mat of uniform thickness throughout. All these possible multiple mat layouts are within the purview of this invention and might be chosen in accordance with the design considerations with regard to the particular final rolled product made as in my prior invention, or the particular baled product made in accordance with this invention and now to be described with reference to FIGS. 4 through 6.

My prior U.S. Pat. No. 5,246,754 schematically illustrates a rolling machine into which the previously described mats are fed for rolling into a finished post-like product. Arrow 29 in FIG. 2 indicates the preferred direction of feed into the rollers for a single mat. This invention contemplates the intermediate step of stacking the mats into bales after cutting and flattening and before rolling. Details of the rolling operation used to create posts are given in my prior patent. Details of finishing and securing are also found in my prior patent. The particular baled block product made in accordance with this invention will now be described with reference to FIGS. 4–6.

Figure 4:
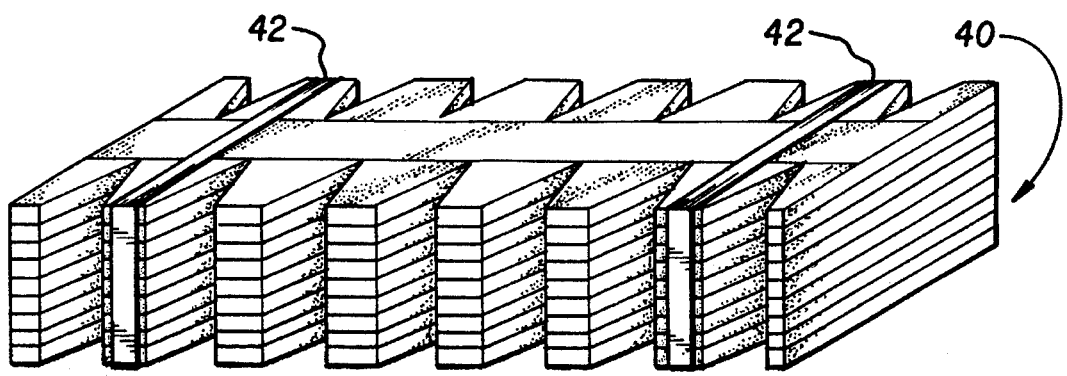
FIG. 4 is a perspective view of a block formed by stacking several mats atop one another and securing them together with bands.

FIG. 4 shows a simple stack of flattened tire mats 40 held together by bands 42. Bands 42 may be conventional steel or polyethylene straps and may be applied with conventional tools. Such a banded stack could be manually moved and stored. It is contemplated that a group of such stacks could easily be palletized and further strapped together to facilitate warehousing and handling with fork lift trucks. One primary function served by creating the banded stack is that it allows the rolling operation of my prior patent to be performed at a remote site from the cutting operation performed on the incoming used tire carcasses. It is contemplated that many small collecting, cutting, and baling sites could serve fewer large rolling plants. The cutting and baling of the tire carcasses near their point of origin would significantly reduce transportation costs to the rolling plants. Also, the baled product could be easily warehoused to buffer fluctuations in supply and demand.

Figure 5:
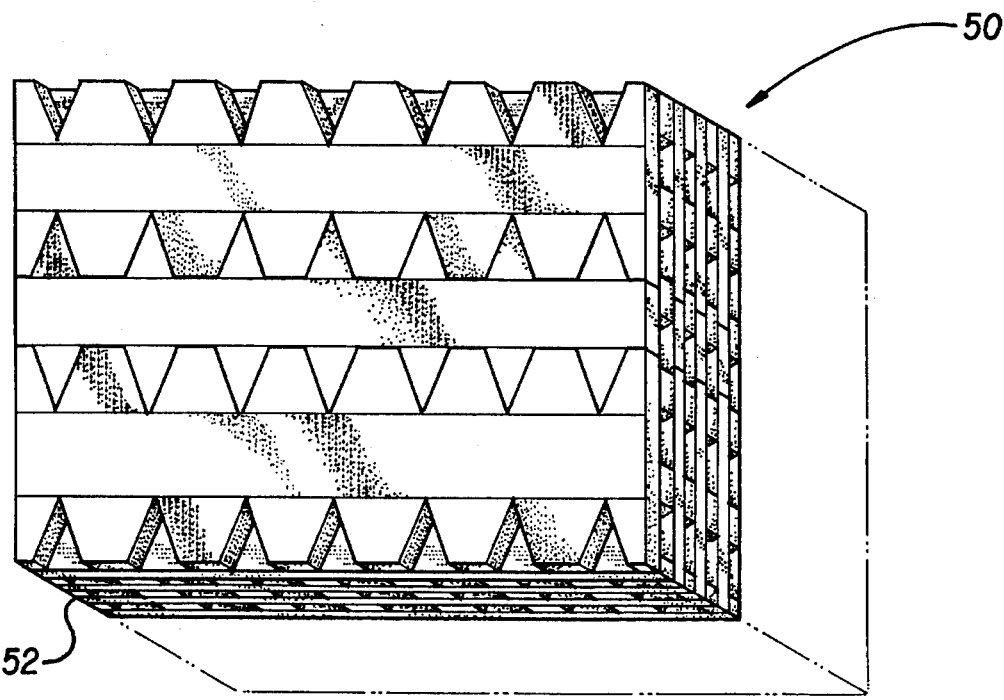
FIG. 5 is a top view of another embodiment of a block formed by stacking side-by-side mats atop one another with alternating layers oriented in opposite directions.

FIG. 5 shows a cube or block formed from stacked flattened tire mats. In this arrangement three individual mats are laid edge to edge with their long edges parallel. The long edges, of course, are not straight because they are the folded out sections of the cut side wall portions such as 20 in FIG. 2 or 30 in FIG. 3. It might be advantageous in this embodiment to alternate the cut style of FIG. 2 with the cut style of FIG. 3 on the edgewise adjacent mats of the same layer. As previously described, these cuts are designed to have the projections of one fill the voids of the other. After one layer of three side-by-side mats is formed the next layer is formed on top of the first with the long edges perpendicular to the mats of the first layer. A block 50 is thus formed, layer by layer, until the overall dimensions are approximately cubical. The mats forming the cube may be held together by adhesive 52 between the individual layers. The mats forming the cube may also be held together by bands as in FIG. 4 or by pins as to be described with regard to FIG. 6. In general any of the block arrangements shown in FIGS. 4–6 may be held together by any of the shown securement methods of banding, adhesives, or pinning. Indeed, the artisan will recognize many other conventional methods of securing the mats in arrangements forming laminated blocks.

Figure 6:
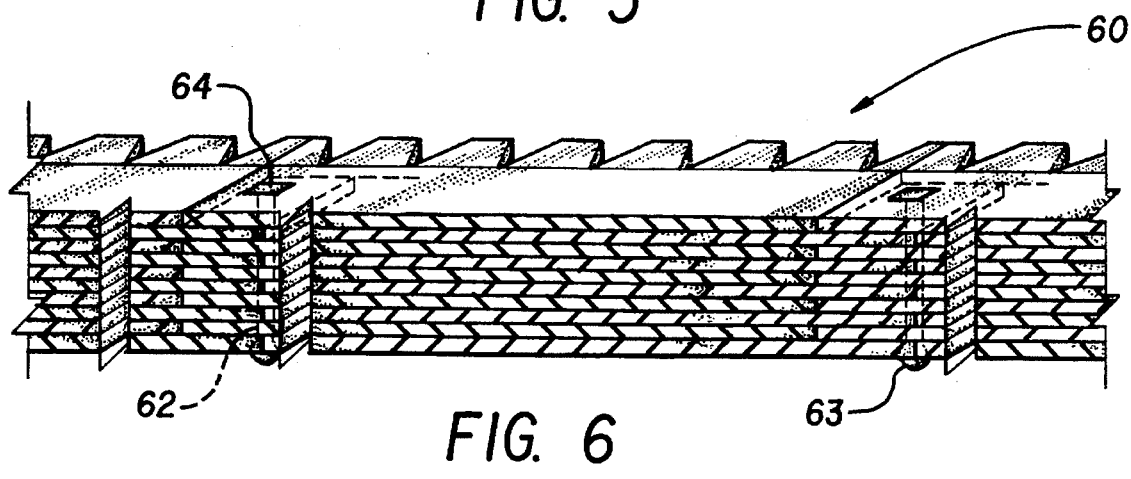
FIG. 6 is a perspective view of yet another embodiment of a block formed by interleaving the end edges of two adjacent stacks and securing the stacks with pins.

FIG. 6. shows a final arrangement 60 of the flattened tire mats. The individual mats of each layer are overlapped slightly and interleaved in end-to-end fashion. Then the layers are secured in position using elongated pins 62 with enlarged heads 63. Washer-like devices 64 may be secured to the ends of pins 62 opposite enlarged heads 63. The pins obviously could be simple rods with slip washers 64 at both ends. The slip washers contemplated are conventional and slide freely onto the rod on one direction but are frictionally prevented from sliding in the other direction. The artisan will recognize many other forms of fastening devices that will accomplish the same result.

It is also contempleted that adhesive could be placed between the stacked layers to form a durable block useful as a construction element. the properties of the adhesive used could be used to control the properties of the overall lamination. Blocks such as these could be directly used as blasting mats, traffic restraint walls, temporary flood levees, or beach erosion devices. It is also noted that these composite rubber blocks could be machined so as to be joined together to form a general purpose wall or fence. The superb vibration isolation properties of this composite mat material would also make them desirable for use as machinery supports. The superior corrosion resistance of the laminated mats would make them ideal for use as oyster beds.

The finally formed mat bales may be shaved and shaped as desired with general purpose tools. Finishing touches may be made on the exterior surface of the tire mat bale as soon as it has been formed. For example, any high spots or lumps could be planed away to form a smooth, perfectly flat edged final product. A shaper tool might also be used for more complex machining operations such as cutting mortises or screw threads into the exterior surface of the finished product. It is submitted that machinery (not shown) is available to form the composite rubber bales disclosed herein. Indeed, the product may be easily formed by conventional mechanical means well within the realm of current technology. Claims to any further special purpose machinery particularly suited to forming my baled composite rubber products might form the basis for future Patents.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the presented examples of stacking the mats to form a block are by no means exhaustive of the many ways the mats could be oriented and stacked. Also, the final form of the block need not be a rectangular parallelopiped as shown in the examples.

Upon further study of the specification and appended claims, further objects and advantages of this invention will become apparent to those skilled in the art.

I claim:

1. An article for use as a multiple purpose construction element comprising:

a generally rectangular block made up of stacked layers of flat flexible mats wherein each said flexible mat is generally rectangular and is formed from an entire used tire casing having a series of slits in the sidewalls thereof with at least one cut through a sealing bead of the casing, said entire used tire casing being unrolled and flattened, and retaining means for holding adjacent layers of said block together so as to provide structural rigidity to said construction element.

2. The article of claim 1, wherein said retaining means comprises adhesive applied between adjacent surfaces of said stacked layers.

3. The article of claim 1, wherein each one of said stacked layers of said flexible mats comprises used tire casings which have been cut open and flattened in such a manner so as to facilitate juxtaposing or superposing individual tire casings to preconfigure said flexible mats into an appropriate size and shape to form a block of predetermined dimensions.

4. The article of claim 3, wherein each one of said flexible mats is generally rectangular having long and short edges and each said layer is formed by arranging a group of said mats with their long edges adjacent and alternating layers are stacked with the long edges perpendicular to the long edges of adjacent layers, so as to form a block of approximately equal length, width and height.

5. The article of claim 1, wherein said retaining means comprises;

at least one band means encircling said block; and fastener means for securing said band means in place and firmly holding each said layer to adjacent layers.

6. The article of claim 5, wherein said retaining means additionally comprises adhesive means applied between adjacent surfaces of said stacked layers.

7. The article of claim 6, wherein the overall mechanical properties of said article are varied by choosing different adhesive means.

8. The article of claim 5, wherein each one of said stacked layers of said flexible mats comprises used tire casings which have been cut open and flattened in such a manner so as to facilitate juxtaposing or superposing individual tire casings to preform said flexible mat into an appropriate size and shape to form a block of predetermined dimensions.

9. The article of claim 8, wherein each one of said flexible mats is generally rectangular having long and short edges and each said layer is formed by arranging a group of said mats with their long edges adjacent and alternating layers are stacked with the long edges perpendicular to the long edges of the adjacent layers, so as to form a block of approximately equal length, width and height.

* * * * *